United States Patent [19]
Saito

[11] Patent Number: 5,721,978
[45] Date of Patent: Feb. 24, 1998

[54] DISTANCE MEASURING APPARATUS

[75] Inventor: Tatsuo Saito, Saitama, Japan

[73] Assignee: Fuji Photo Optical Co., Ltd., Saitama, Japan

[21] Appl. No.: 701,504

[22] Filed: Aug. 22, 1996

[30] Foreign Application Priority Data

Aug. 23, 1995 [JP] Japan ................................ 7-214818

[51] Int. Cl.$^6$ ............................................ G03B 3/10
[52] U.S. Cl. ................................ 396/100; 396/111
[58] Field of Search ........................... 396/89, 100, 111, 396/112, 113, 114, 115, 116, 117

[56] References Cited

U.S. PATENT DOCUMENTS

| 4,191,882 | 3/1980 | Sato | 396/89 |
| 4,606,630 | 8/1986 | Haruki et al. | 356/1 |

Primary Examiner—Russell E. Adams
Attorney, Agent, or Firm—Leydig, Voit & Mayer, Ltd.

[57] ABSTRACT

In a distance measuring apparatus, a light-detecting portion in a trigonometric distance measuring apparatus using a passive method is also used as a light-detecting portion for photometry processing. Thus, the luminance range for distance measurement is widened. The distance measuring apparatus includes two light-detecting portions arranged in correspondence with two optical systems. Correction filters for luminous efficacy correction is arranged in the optical paths of each optical system covering halves of the corresponding light-detecting portions.

12 Claims, 5 Drawing Sheets

DISTANCE MEASURING APPARATUS

BACKGROUND OF THE INVENTION

1. Field of the Invention

The present invention relates to a distance measuring apparatus and, more particularly, to a trigonometric distance measuring apparatus using a passive method for measuring the distance to an object on the basis of natural light reflected from the object.

2. Related Background Art

Conventionally, various improvements have been made to decrease the number of components in distance measuring apparatuses. In some cases, one functional component is used for different purposes. In this case, a light-receiving portion in a passive distance measuring apparatus is constituted by a light-receiving element for measuring the intensity of light. By utilizing the function of this light-receiving element, the light-receiving portion can also be used as a light-receiving portion for measuring the quantity of measuring light.

When the quantity of measuring light is to be measured, however, a light-receiving element with spectral sensitivity approximate to luminous efficiency must be used. The light-receiving portion for distance measurement cannot be simply used as the light-receiving portion for photometry. A sensitivity correction filter is normally arranged in the optical path to the light-receiving element to correct the luminous efficiency of the light-receiving element when the spectral sensitivity of the light-receiving element is to be adjusted.

In this manner, if the light-receiving element of the passive distance measuring apparatus is used for photometry, such a sensitivity correction filter must be arranged for the light-receiving element. However, for example, if the luminance of the outer atmosphere is low, the quantity of natural light reflected by an object is naturally small. When the object has a slight contrast difference, the slight difference between the reflected light components cannot be properly received via the sensitivity correction filter, resulting in erroneous distance measurement.

SUMMARY OF THE INVENTION

The present invention has been made to solve the above problem, and has as its object to provide a distance measuring apparatus capable of properly performing distance measurement even when a light-receiving element in a passive distance measuring apparatus is also used for photometry processing.

An aspect of the invention is a distance measuring apparatus of a passive method, for receiving light reflected by an object to measure a distance to the object, comprising:

two optical systems respectively for condensing the light reflected by the object;

light-receiving means respectively disposed in correspondence with the two optical systems to detect optical images condensed by the corresponding optical systems, each light-receiving means having first and second light-receiving portions; and correction filters for correcting sensitivities of the second light-receiving portions.

According to the present invention, a distance measuring apparatus of a passive method receives light reflected by an object to measure a distance to the object. In the distance measuring apparatus, light-receiving means respectively disposed in correspondence with two optical systems respectively for condensing the light reflected by the object are constituted as follows. That is, each light-receiving means has first and second light-receiving portions. The distance measuring apparatus comprises correction filters for correcting sensitivities of the second light-receiving portions. With this arrangement, the light-receiving region with the correction filter and the light-receiving region with no correction filter are formed for one light-receiving means.

Further, detecting means detects luminance of the object obtained by the two second light-receiving portions with the correction filters. Determining means determines whether the detected luminance is high or low. When the determining means determines that the luminance is high, first distance measuring means measures the distance to the object on the basis of optical images received by the second light-receiving portions with the correction filters. When the determining means determines that the luminance is low, second distance measuring means measures the distance to the object on the basis of optical images received by the first light-receiving portions without any correction filter. In this manner, the first or second light-receiving portions are properly selected and used in accordance with the luminance of the object so as to preferably perform distance measurement.

The detecting means comprises first means for counting a response time of each of the second light-receiving portions at which an integrated value output from the second light-receiving portion reaches a predetermined reference level earliest, and second means for specifying the luminance of the object on the basis of the response time counted by the first means. With this arrangement, the highest one of the luminances of the optical image of the object is detected, and photometry processing is simply performed on the basis of the detected value.

The detecting means comprises a plurality of third means for outputting detection signals when integrated values output from the respective second light-receiving portions exceed a predetermined reference level, the third means being arranged in correspondence with the respective second light-receiving portions, fourth means for respectively counting response time intervals until the detection signals are output from the individual third means, and fifth means for specifying the luminance of the object on the basis of data of the response time intervals counted by the fourth means. In this manner, photometry processing is performed on the basis of the detection results of the second light-receiving portions as a whole.

When the determining means determines that the luminance specified by the fifth means is high, the first distance measuring means executes distance measurement calculation by using the detection results having detected in the photometry processing. That is, the distance measurement calculation is executed on the basis of all or part of the data of the response time intervals counted by the fourth means.

The present invention will be more fully understood from the detailed description given hereinbelow and the accompanying drawings, which are given by way of illustration only and are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications

DESCRIPTION OF THE PREFERRED EMBODIMENT

Figure 1:
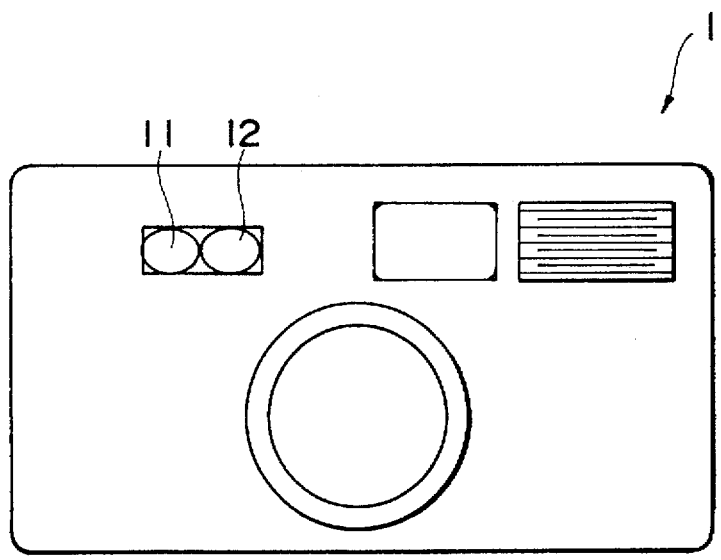
FIG. 1 is a front view showing the outer appearance of a camera with a distance measuring apparatus according to an embodiment of the present invention.

A distance measuring apparatus according to an embodiment of the present invention will be described below with reference to the accompanying drawings. Note that the same reference numerals denote the same or corresponding parts throughout the drawings.

FIG. 1 is a front view showing the outer appearance of a camera with a distance measuring apparatus according to this embodiment of the present invention. A camera 1 comprises a distance measuring apparatus which can execute both trigonometric distance measurement using a passive method and photometry.

The distance measuring apparatus is arranged at the upper corner of the front surface of the camera 1. The distance measuring apparatus comprises right and left optical systems 11 and 12 as two optical systems for condensing natural light reflected by an object.

Figure 2A:
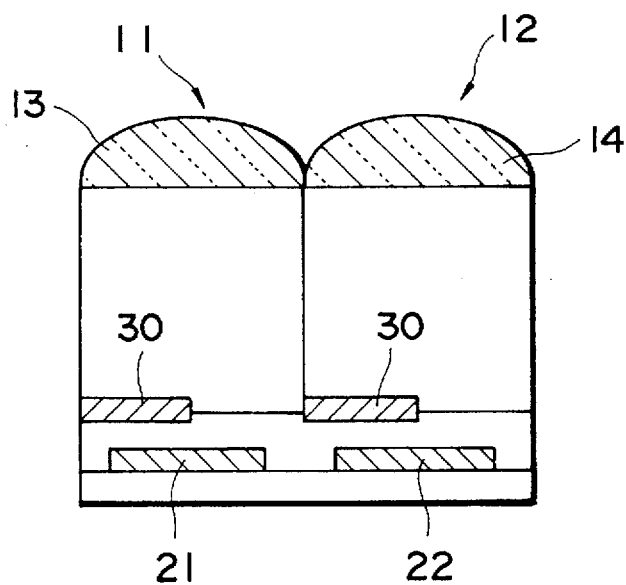
FIG. 2A is a sectional side view schematically showing two optical systems and corresponding light-receiving portions in the distance measuring apparatus according to an embodiment of the present invention.
Figure 2B:
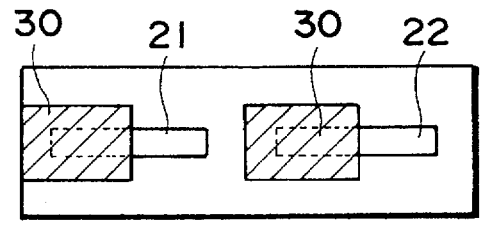
FIG. 2B is a plan view showing only the light-receiving portions.

FIGS. 2A and 2B are a sectional side view and a plan view respectively schematically showing the right and left optical systems 11 and 12. The natural light reflected by the object and its background is condensed via light-receiving lenses 13 and 14 on the front surfaces of the two optical systems. The optical images are formed on two light-receiving portions 21 and 22 arranged in the two optical systems 11 and 12.

Each of the light-receiving portions 21 and 22 is constituted by a photodiode array including photodiodes PD (see FIGS. 3A and 3B) arrayed in a line. A correction filter 30 for luminous efficacy correction is disposed in the optical path between each of the light-receiving lenses 13 and 14 and each of the light-receiving portions 21 and 22 so as to cover half the photodiode array.

Figure 3A:
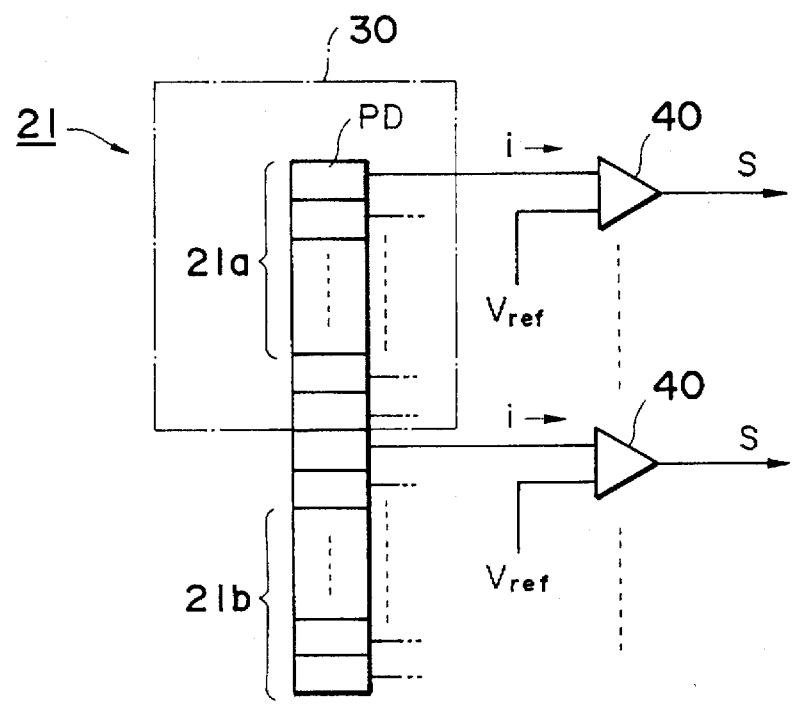
FIGS. 3A and 3B are explanatory views schematically showing the light-receiving portions, connections with peripheral elements, signals, and the like, respectively.
Figure 3B:
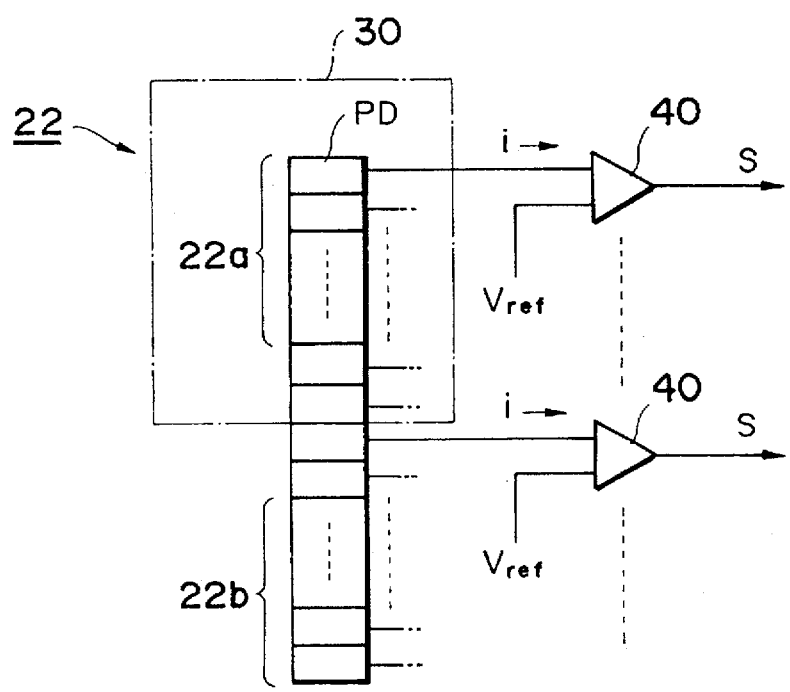

FIGS. 3A and 3B show the detailed arrangements of the light-receiving portions 21 and 22, respectively. As described above, each of the light-receiving portions 21 and 22 includes the photodiodes PD. A photodiode array 21a or 22a is positioned in a region corresponding to the correction filter 30, whereas a photodiode array 21b or 22b is positioned in a region not covered with the correction filter 30. When the optical images of the object are formed on the light-receiving portions 21 and 22 via the above-described optical systems 11 and 12, the optical image of the object condensed via the optical system 11 is formed over the photodiode arrays 21a and 21b. Similarly, the optical image of the object condensed via the optical system 12 is formed over the photodiode arrays 22a and 22b.

When the optical images are incident on the light-receiving portions 21 and 22, each photodiode PD outputs a current in accordance with the intensity of the received light. The currents are integrated with the junction capacitance of the photodiode PD, and its integrated value is output as a signal i. A comparator 40 is arranged in correspondence with each photodiode PD. The output signal from each photodiode PD is supplied to the comparator 40 and compared with a reference voltage $V_{ref}$. When the level of the output signal i exceeds the level of the reference voltage $V_{ref}$, the comparator 40 outputs a signal S to a quantizing portion (not shown). The quantizing portion detects the response time of the signal S supplied from each photodiode PD. The response time of the signal S is a time interval until the level of the signal i as the integrated value reaches that of the reference voltage $V_{ref}$. That is, the intensity of light received by each photodiode PD is converted into the interval of the response time of the signal S. The response time of the signal S is measured by counting clocks output from a CPU (not shown).

Figure 4:
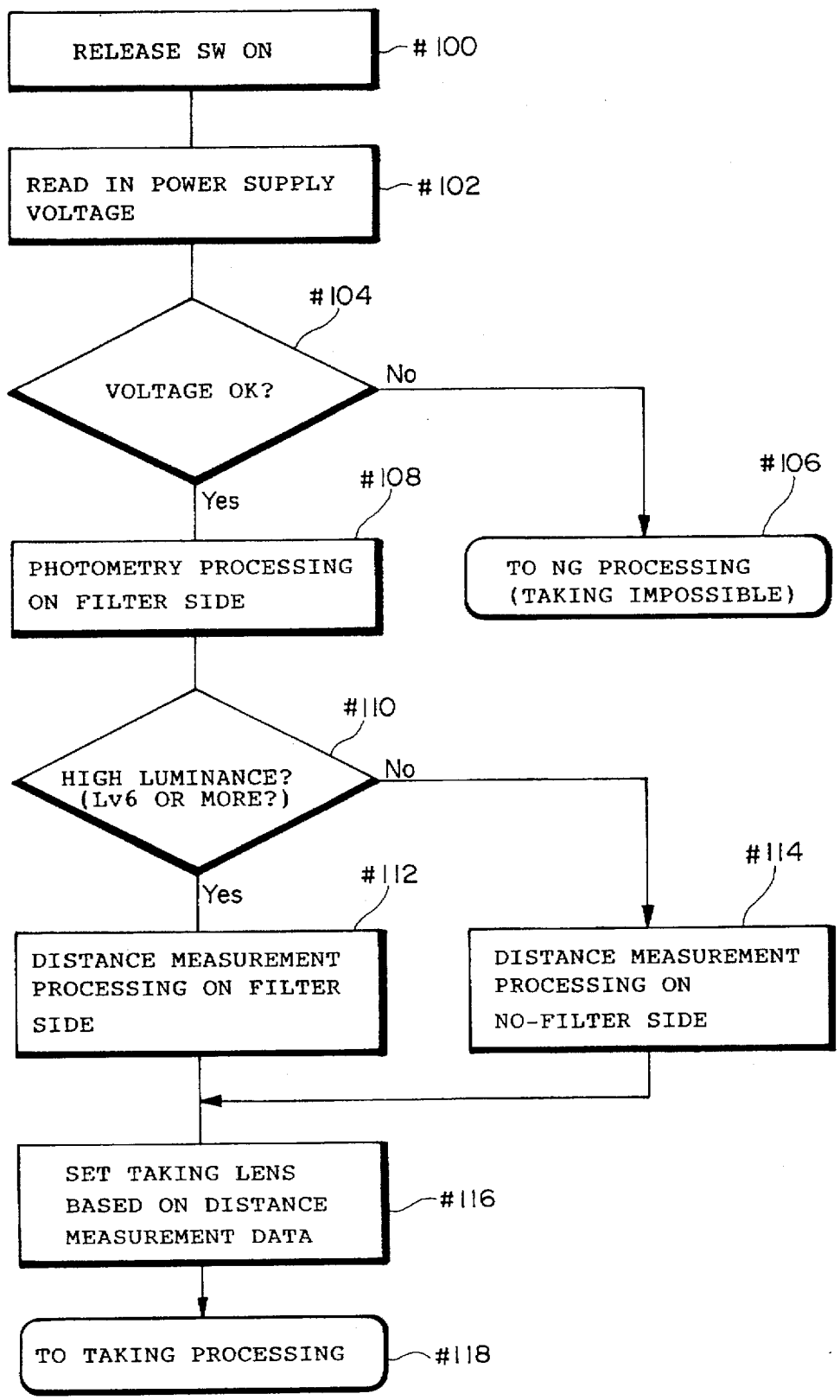
FIG. 4 is a flow chart showing photometry and distance measurement operations in the distance measuring apparatus according to an embodiment of the present invention.

The operation of this distance measuring apparatus will now be described with reference to FIG. 4.

First of all, when a release switch is depressed with the camera facing to the object (#100), a power supply voltage is read in to check the voltage value (#102 and #104). If the read voltage value does not reach a threshold value ("NO" in #104), the flow shifts to predetermined NG processing (#106) to inform the user that taking processing is impossible with a display, a warning sound, or the like.

When the read voltage value reaches the threshold value ("YES" in #104), photometry processing is performed by using only the photodiode arrays 21a and 22a of the light-receiving portions 21 and 22 (#108). Only the right optical system 11 is exemplified. In this case, the optical image of the object formed on the right optical system 11 is formed over the photodiode arrays 21a and 21b. In performing photometry, only the photodiode array 21a positioned below the correction filter 30 is selected. The CPU selects only data (response time data) detected by the photodiodes PD of the photodiode array 21a. Similarly in the left optical system 12, the CPU selects only data detected by the photodiodes PD of the photodiode array 22a positioned immediately below the correction filter 30.

In performing photometry, only the detection data of light received via the luminous efficacy correction filters 30 are obtained by this selecting operation. The photometry processing is performed using the detection data. As a detailed photometry method, the following method can be employed. That is, the luminance of the overall object is simply estimated on the basis of the time at which the signal S is detected earliest, i.e., the shortest response time interval, thereby performing photometry. In this case, the photometry processing is interrupted upon detection of the signal S at the earliest response time.

Next, it is checked whether the luminance of the object is high or low on the basis of the value obtained in #108

(#110). For example, the luminance of the object is determined to be high for Lv.6 or more or to be low for less than Lv.6. If the luminance of the object is too high, a difference between the detection timings of output signals S may not be clearly detected. In such a case, a slight contrast difference in the object cannot be properly detected.

For this reason, if the luminance of the object is determined to be high ("YES" in #110), the CPU selects the photodiode arrays 21a and 22a arranged in correspondence with the correction filters 30. Detection processing is restarted for the respective photodiodes PD corresponding to the photodiode arrays 21a and 22a. Photometry processing is executed on the basis of the detection results obtained from these photodiodes PD. With this processing, the intensity of light incident on the photodiodes PD can be decreased to properly detect a subtle contrast difference. Note that distance measurement processing is basically the same as the photometry processing described above. However, in the distance measurement processing, a phase difference between the two obtained optical images, and the like are obtained on the basis of data (the response time data of the respective signals S) detected by all or some of the photodiodes PD of the photodiode arrays 21a and 22a, thereby calculating the distance to the object (#112).

The subsequent taking processing such as setting a taking lens based on the obtained distance measurement data (#116) is executed on the basis of this distance measurement value (#118).

On the other hand, if the luminance of the object is determined to be low ("NO" in #110), the CPU first selects the photodiode arrays 21b and 22b on a side having no correction filter 30. Detection processing is restarted for the respective photodiodes PD corresponding to the photodiode arrays 21b and 22b. Distance measurement processing is executed on the basis of the detection results obtained from these photodiodes PD (#114).

The processing in #116 and #118 is executed on the basis of the obtained distance measurement data in a similar manner as described above.

Figure 5A:
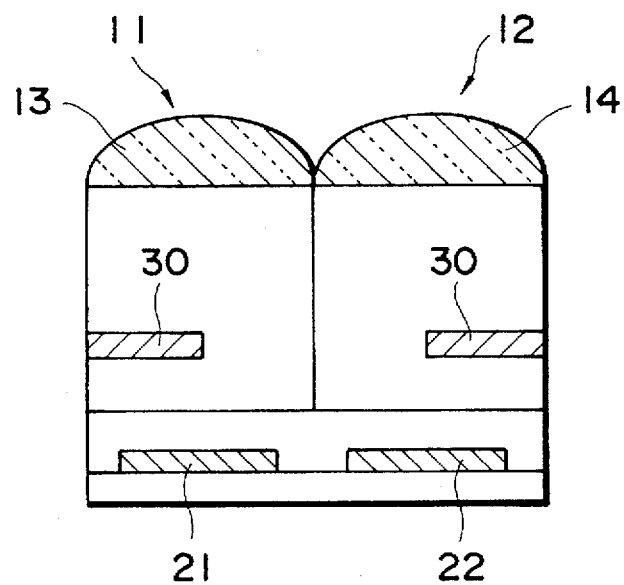
FIG. 5A is a sectional side view schematically showing the two optical systems and the corresponding light-receiving portions.
Figure 5B:
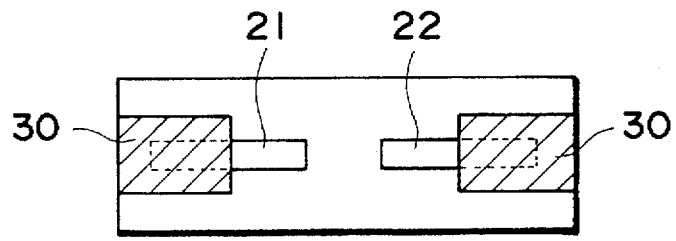
FIG. 5B is a plan view showing only the light-receiving portions.

In this manner, a properly detectable range of the luminance of the object by the light-receiving portions 21 and 22 is widened by switching the use of the light-receiving photodiodes in accordance with the luminance of the object. Note that, strictly speaking, the distance measurement range for a target object slightly changes upon switching the photodiode arrays 21a and 22a and the photodiode arrays 21b and 22b. However, if the difference is set to 1.5°, a shift between the distance measurement ranges is only about 78 mm for an object separated from the camera by 3 m. If it is taken into consideration that most of the objects are persons, this shift does not substantially interfere with distance measurement. In addition, the shift in the distance measurement range can be reduced by setting the light-receiving portions 21 and 22 and the filter 30 in a positional relationship as shown in FIGS. 5A and 5B.

The photometry processing in #108 of the flow chart described above can also be performed as follows. For example, detection data from all the photodiodes PD which constitute a selected photodiode array can be used and averaged to execute so-called averaged overall light reading. In addition, of detection results obtained from the individual photodiodes PD, detection results obtained from the specific photodiodes PD can be weighted and added to execute so-called center-weighted light reading. Further, detection results from only the photodiodes PD limited within an arbitrary range can be added to select the photometry range.

In the distance measuring apparatus described above, the photodiode is exemplified as the light-receiving element of the light-receiving portion. The light-receiving portion can also be constituted by Using an image pickup element such as a CCD.

Figure 6A:
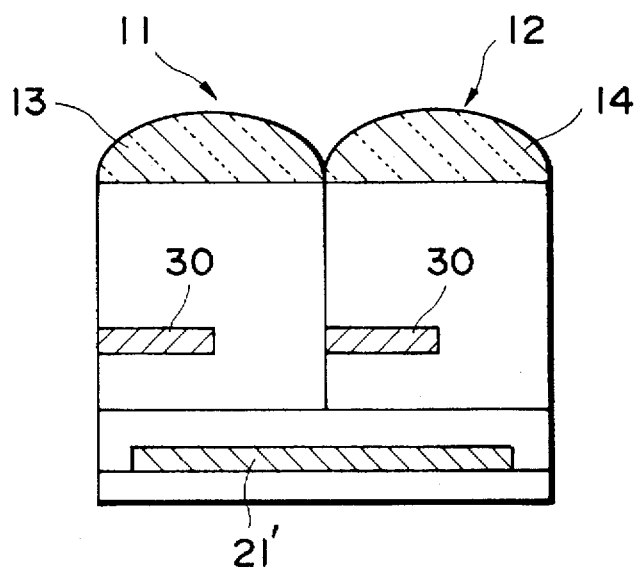
FIG. 6A is a sectional side view schematically showing the two optical systems and a corresponding light-receiving portion.
Figure 6B:
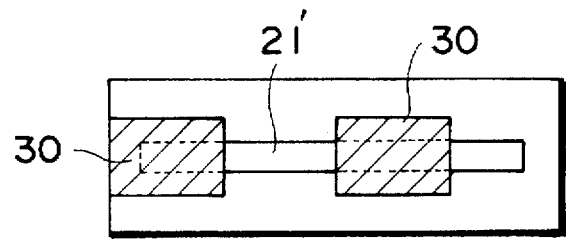
FIG. 6B is a plan view showing only the light-receiving portion.

The above embodiment exemplifies the distance measuring apparatus of a type in which the light-receiving portions 21 and 22 are independently arranged, each of which has the luminous efficacy correction filter formed at its part. However, as shown in FIGS. 6A and 6B, the distance measuring apparatus may comprise a light-receiving portion 21' formed by integrating the light-receiving portions 21 and 22. The filters 30 may be disposed in the optical paths corresponding to the light-receiving portions 21 and 22. Furthermore, one light-receiving portion 21 or 22 can be constituted by setting a photodiode array with a luminous efficacy correction filter and another photodiode array (without any correction filter) adjacent to each other.

As has been described above, in the distance measuring apparatus, the second light-receiving portion with a correction filter and the first light-receiving portion without any correction filter are formed for one light-receiving means. Therefore, two types of light-receiving portions for distance measurement and photometry can be easily formed for one light-receiving means.

Particularly, a determining means determines whether the luminance of an object is high or low, and the first and second light-receiving portions are selectively used. Therefore, the luminance range allowing proper distance measurement can be widened.

By giving one light-receiving means two functions, the second light-receiving portion for performing photometry is consequently constituted by a photosensor array. Therefore, various types of photometry processing can be executed, like distance measuring apparatuses as mentioned above.

From the invention thus described, it will be obvious that the invention may be varied in many ways. Such variations are not to be regarded as a departure from the spirit and scope of the invention, and all such modifications as would be obvious to one skilled in the art are intended for inclusion within the scope of the following claims.

The basic Japanese Application No. 214818/1995 filed on Aug. 23, 1995 is hereby incorporated by reference.

What is claimed is:

1. A distance measuring apparatus using a passive method for receiving light reflected by an object to measure distance to the object comprising:

two optical systems for respectively condensing the light reflected by the object;

two light-receiving means respectively disposed in correspondence with said two optical systems to detect optical images condensed by said corresponding optical systems, each light-receiving means having first and second light-receiving portions;

two correction filters for correcting respective sensitivities of said second light-receiving portions;

detecting means for detecting luminance of the object on the basis of the optical images of the object received by said two second light-receiving portions;

determining means for determining whether the luminance detected by said detecting means is high or low;

first distance measuring means for measuring the distance to the object on the basis of the optical images received by said two second light-receiving portions when said determining means determines that the luminance is high; and second distance measuring means for measuring the distance to the object on the basis of the optical images received by said two first light-receiving portions when said determining means determines that the luminance is low.

2. An apparatus according to claim 1, wherein said detecting means comprises:

first means for counting a response time of each of said second light-receiving portions at which an integrated value output from said second light-receiving portion reaches a predetermined reference level earlier; and second means for specifying the luminance of the object on the basis of the response time counted by said first means.

3. An apparatus according to claim 1, wherein said detecting means further comprises:

a plurality of third means for outputting detection signals when integrated values output from said respective second light-receiving portions exceed a predetermined reference level, said third means being arranged in correspondence with said respective second light-receiving portions;

fourth means for respectively counting response time intervals until the detection signals are output from said individual third means; and fifth means for specifying the luminance of the object on the basis of data of the response time intervals counted by said fourth means.

4. An apparatus according to claim 3, wherein said first distance measuring means executes distance measurement calculation on the basis of the data of the response time intervals having been counted by said fourth means when said determining means determines that the luminance specified by said fifth means is high.

5. An apparatus according to claim 1, wherein said first light-receiving portion is a first photosensor array including a plurality of photosensors, and said second light-receiving portion is a second photosensor array including a plurality of photosensors.

6. An apparatus according to claim 1, wherein said first and second light-receiving portions are constituted by a plurality of CCDs.

7. An apparatus according to claim 1, wherein said distance measuring apparatus performs averaged overall light reading on the basis of detection results of said first and second light-receiving portions.

8. An apparatus according to claim 1, wherein said distance measuring apparatus performs center-weighted light reading on the basis of detection results of said first and second light-receiving portions.

9. A distance measuring apparatus using a passive method for detecting light reflected from an object to measure distance to the object, the apparatus comprising:

two optical systems for respectively condensing light reflected from an object;

two light detecting means respectively disposed in correspondence with said two optical systems for detecting optical images condensed by said corresponding optical systems, each light detecting means having first and second light detecting portions;

two correction filters for correcting respective sensitivities of said light detecting portions, respectively disposed between said two optical systems and said two light detecting means;

detecting means for detecting luminance of the object from the optical images detected by said two second light detecting portions;

determining means for determining whether the luminance detected by said two second light detecting portions is larger than a reference level;

first distance measuring means for measuring the distance to the object from the optical images detected by said two second light detecting portions when said determining means determines that the luminance exceeds the reference level; and second distance measuring means for measuring the distance to the object from the optical images detected by said two first light detecting portions when said determining means determines that the luminance does not exceed the reference level.

10. The apparatus according to claim 9 wherein said detecting means comprises:

counting means for counting response time until an output from each of said second light detecting portions reaches the reference level; and means for specifying the luminance of the object according to the response time.

11. The apparatus according to claim 9 wherein said detecting means comprises:

a plurality of output means for outputting detection signals when outputs from said respective second light detecting potions exceed the reference level, said output means being arranged in correspondence with said second light detecting portions;

counting means for respectively counting response times until the detection signals are output by respective output means; and means for specifying the luminance of the object according to the response time intervals.

12. The apparatus according to claim 11 wherein said first distance measuring means calculates distance according to the response time intervals when said determining means determines that the luminance exceeds the reference level.

* * * * *